United States Patent
Chang (10) Patent No.: US 8,858,122 B2
(45) Date of Patent: Oct. 14, 2014

(54) METHOD AND STRUCTURE FOR REINFORCING ECOLOGICAL GREENING FABRIC

(76) Inventor: Yu-shun Chang, Dongguan (CN)

( * ) Notice: Subject to any disclaimer, the term of this patent is extended or adjusted under 35 U.S.C. 154(b) by 16 days.

(21) Appl. No.: 13/697,214

(22) PCT Filed: May 11, 2011

(86) PCT No.: PCT/CN2011/073925
§ 371 (c)(1),
(2), (4) Date: Feb. 21, 2013

(87) PCT Pub. No.: WO2011/140979
PCT Pub. Date: Nov. 17, 2011

(65) Prior Publication Data
US 2013/0156511 A1  Jun. 20, 2013

(30) Foreign Application Priority Data

May 12, 2010   (CN) .......................... 2010 1 0173275

(51) Int. Cl.
*E02D 17/20* (2006.01)
*A01G 13/00* (2006.01)
*E02D 3/00* (2006.01)

(52) U.S. Cl.
CPC ................ *E02D 3/005* (2013.01); *E02D 17/20* (2013.01); *A01G 13/0268* (2013.01)
USPC .................................... 405/302.6; 405/302.7

(58) Field of Classification Search
USPC ................. 405/302.4, 302.6, 302.7
See application file for complete search history.

(56) References Cited

U.S. PATENT DOCUMENTS

| | | | | |
|---|---|---|---|---|
| 2,333,287 A | * | 11/1943 | Baird | 405/270 |
| 3,283,518 A | * | 11/1966 | Toffolon | 405/270 |
| 3,474,625 A | * | 10/1969 | Bennett et al. | 405/270 |
| 4,469,176 A | * | 9/1984 | Zison et al. | 405/129.95 |
| 4,678,375 A | * | 7/1987 | Gagle et al. | 405/270 |
| 4,696,599 A | * | 9/1987 | Rakoczynski et al. | 405/129.7 |
| 5,258,217 A | * | 11/1993 | Lewis | 405/129.75 |
| 5,564,864 A | * | 10/1996 | Simpson et al. | 405/270 |
| 7,207,742 B2 | * | 4/2007 | Prevost | 405/302.7 |
| 7,399,145 B2 | * | 7/2008 | Clark | 405/302.7 |
| 2005/0111918 A1 | * | 5/2005 | Yeager | 405/129.95 |

FOREIGN PATENT DOCUMENTS

| | | |
|---|---|---|
| CN | 1928249 A | 3/2007 |
| CN | 201183955 Y | 6/2009 |
| CN | 101524031 A | 9/2009 |
| CN | 101838984 A | 9/2010 |
| CN | 201797771 U | 4/2011 |

* cited by examiner

*Primary Examiner* — Frederick L Lagman
(74) *Attorney, Agent, or Firm* — McDonald Hopkins LLC (57) ABSTRACT

A method for reinforcing an ecological greening fabric, including steps of: forming a trench (2) in an area to be afforested; laying a first ecological fabric (3) on the surface (1) of the area and in the trench (2); refilling a first soil layer (4) in the trench (2) to press the first ecological fabric (3); and fastening a second ecological fabric (5) on the first soil layer (4) to hold the first soil layer (4) by the second ecological fabric (5), so that the first and second ecological fabrics (4) and (5) in the trench (2) and the trench (2) jointly form a bag structure for fixing the first soil layer (4). A structure for reinforcing an ecological greening fabric is also disclosed.

15 Claims, 7 Drawing Sheets

METHOD AND STRUCTURE FOR REINFORCING ECOLOGICAL GREENING FABRIC

TECHNICAL FIELD

The present invention relates to a greening method based on ecological fabrics, and particularly, to a reinforcing method and structure of ecological greening fabrics.

TECHNICAL BACKGROUND

With the increasing public attentions to ecological problems, greening projects in areas such as deserts, slopes, embankments and wastelands are more and more concerned by the society. One of the typical greening methods available is a fabric-spreading method in which an ecological fabric is laid on the surface of the area to be afforested. In some conditions (e.g. soil slopes, etc.), the method is to secure the soil/sands using the ecological fabrics, and plant growth materials are placed under the ecological fabrics; and in other conditions (e.g. deserts, etc.), the method is to place the plant growth materials on the ecological fabrics. However, in any conditions, the greening is made by means of the ecological fabrics, therefore, it is critical in the whole greening process how to secure the ecological fabrics. In the traditional methods, the ecological fabric is fixed to the area to be afforested by an anchor rod piercing the ecological fabric, in this case, the anchor rod may be loosened due to the decrease in the friction force between the anchor rod and the sands or soil, and even be drawn out from the sands or soil, leading to the unsteady fixation of the ecological fabric, and hence to the displacement of the fabric. Such a method merely relying on the anchor rod has a poor effectiveness, and is also not suitable for zones such as deserts. It is also provided a method for fixing the ecological fabric by making trenches in desert areas, but it is needed to fill ecological bags into the trenches to press the ecological fabric. However, the production of the ecological bags is complicated and costly, which apparently does not meet the current needs and is not convenient to marketing promotion.

SUMMARY OF THE INVENTION

In view of the drawbacks of the above-mentioned prior art, an object of the invention is to provide a method and a structure for reinforcing an ecological greening fabric, which can enable the ecological fabrics to be stably connected and easily constructed with a low cost, and can be applicable to various geological environments for effectively greening.

In order to achieve the above object, the present invention employs the following technical solution:

A method for reinforcing an ecological greening fabric, including steps of, a) forming a trench in an area to be afforested; b) laying a first ecological fabric on the surface of the area to be afforested and within the trench, and backfilling a first soil layer within the trench to press the first ecological fabric; c) fastening a second ecological fabric on the first soil layer to hold the first soil layer by the second ecological fabric, so that the first and the second ecological fabrics within the trench and the trench form a bag structure for fastening the first soil layer.

The method further includes a step d1) of backfilling a second soil layer or a fastening weight on the surface of the second ecological fabric located in the trench, with the second ecological fabric being pressed by the second soil layer or by the fastening weight.

The method further includes a step d2) of sequentially passing through the second ecological fabric, the first soil layer, the first ecological fabric by an anchor rod, to a predetermined depth beneath the bottom of the trench, with the second ecological fabric being pressed by the end cap of the anchor rod.

A locking means is further used in the method, and the locking means includes a positioning member, a rope and a positioning cover, and the positioning member is provided with a pivot fulcrum, to which one end of the rope is fixedly connected. After the step a) is completed, the positioning member is buried at a predetermined depth beneath the bottom of the trench, a portion of the rope is also buried together with the positioning member, and a pre-reserved portion of the rope is exposed, and then the rope is pulled by applying a force outwardly, so that the positioning member is rotated a certain degree about the pivot fulcrum in the underground; and then at the step b), after the other end of the rope passes through the first ecological fabric, the first soil layer is backfilled; and then at the step c), the other end of the rope continues to pass through the second ecological fabric, and finally the positioning cover presses the surface of the second the ecological fabric and the rope is securely held, which allows the rope to be tightly tensioned between the positioning cover and the positioning member, so that the first ecological fabric, the first soil layer, and the second ecological fabric are secured by the locking means.

The second ecological fabric may also include an extension portion which is used to cover the surface of another area to be afforested. In this case, a plurality of ecological fabrics can be effectively connected together, and the resistance between adjacent ecological fabrics is increased because of the first soil layer, therefore, the disengagement phenomenon is avoided, and the effect of the enlarged expansion of the ecological fabrics is achieved.

The second ecological fabric may also includes an extension portion which covers the first ecological fabric on the surface of the area to be afforested so as to form a two-layer structure, so that a plant growth material or the like may be disposed between the first ecological fabric and the second ecological fabric.

There is provided a structure for reinforcing an ecological greening fabric, including: a first ecological fabric provided on a surface of an area to be afforested and within a trench, a first soil layer and a second ecological fabric; wherein, the first ecological fabric within the trench is pressed by the first soil layer, the second ecological fabric is fixedly provided on and holds the first soil layer, so that the first and second ecological fabrics within the trench and the trench jointly form a bag structure for fastening the first soil layer.

The surface of the second ecological fabric may be provided with a second soil layer or a fixture with a hole.

The structure above further includes an anchor rod, which includes a body and an end cap connected to an end of the body, wherein, the body sequentially passes through the second ecological fabric, the first soil layer and the first ecological fabric, to a predetermined depth beneath the bottom of the trench, and the end cap presses a surface of the second ecological fabric. The undersurface of the end cap may be provided with a plurality of spikes which is adapted to pierce the second ecological fabric.

The structure above further includes a locking means, which comprises a positioning member, a rope and a positioning cover, wherein, the positioning member is provided with a pivot fulcrum, to which one end of the rope is fixedly connected, the positioning member is buried at a predetermined depth beneath the bottom of the trench and rotated by a certain degree, the other end of the rope sequentially passes through the first ecological fabric, the first soil layer and the second ecological fabric, and is secured by the positioning cover which is arranged on and presses the second ecological fabric, so that the rope is tightly tensioned between the positioning cover and the positioning member, and the first ecological fabric, the first soil layer, and the second ecological fabric are secured by the locking means. The positioning member may a metal plate or a plastic plate; and the rope is a steel wire, an iron wire or a plastic rope. The positioning member may be adhesively bonded with a reinforcing layer provided between the positioning member and the bottom of the trench.

The first soil layer is a plant growth material.

The second ecological fabric may also include an extension portion which covers a surface of another area to be afforested.

The second ecological fabric may also include an extension portion which covers the first ecological fabric on the surface of the area to be afforested so as to form a two-layer structure.

The invention is advantageous in that, with the use of the trench, the first ecological fabric is sunk into the trench and is pressed by the first soil layer, which is then secured by the second ecological fabric, thus prevent the loss of the first soil layer, so that the first ecological fabric and the second ecological fabric within the trench and the trench jointly form a bag structure for securing the first soil layer. As a result, the ecological fabrics can be effectively and stably connected, and their construction is simple. The present invention can be widely applicable to greening construction of various geological environments, such as a desert, a slope and wastelands.

DETAILED DESCRIPTION OF THE INVENTION

The present invention is now further described below with reference to the drawings and embodiments.

Figure 1:
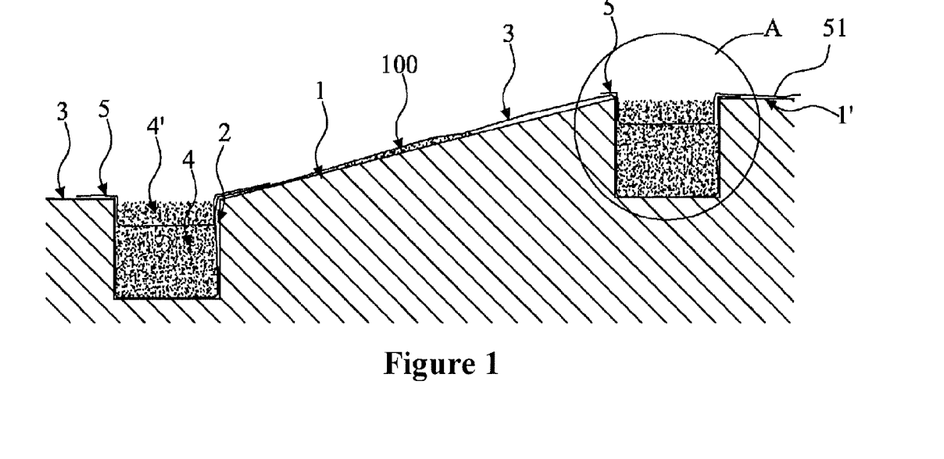
FIG. 1 is a schematic view of the construction structure of a first embodiment of the present invention.
Figure 2:
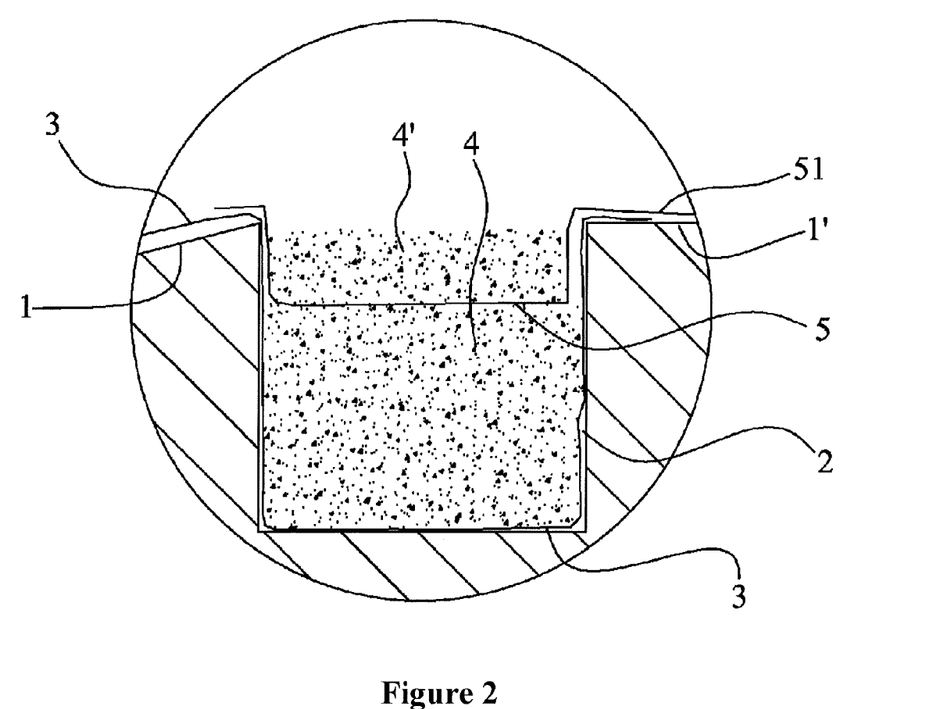
FIG. 2 schematically shows an enlarged structural view of a portion A in FIG. 1.

FIGS. 1 and 2 illustrate a first embodiment of the present invention, which is illustrated by an example of slope greening. The inventive reinforcing structure for ecological greening fabric includes: a first ecological fabric 3 laid on the surface of the area 1 to be afforested and within a trench 3, a first soil layer 4 and a second ecological fabric 5. The first ecological fabric 3 within the trench 2 is pressed by the first soil layer 4, and the second ecological greening fabric 5 is provided on and holds the first soil layer 4 to prevent the loss of the first soil layer 4, so that the first and second ecological fabric 3 and 5 within the trench 2 and the trench 2 jointly form a bag structure for securing the first soil layer 4. The portion of the first ecological fabric 3 that sinks into the trench 2 preferably extends along the wall of the trench 2 to the outside, for a better combination with the second ecological fabric 5. The second ecological fabric 5 in this embodiment is held by a second soil layer 4' filled on the second ecological fabric 5. The first and second soil layers 4 and 4' may be plant growth materials such as soil (including organic soil), vermiculite and perlite, which may be further mixed with an absorbent material, to facilitate the greening even within the trench 2. It would be appreciated that the second ecological fabric 5 may also include an extension portion 51 which covers the surface of another area 1' to be afforested, thus the greening of a large area may be implemented through the repeated reinforcing structures with such extensions, to effectively extend and fasten the ecological fabric.

In the construction method of the reinforcing structure of the embodiment above, firstly, the trench 2 is made in the area 1 to be afforested; then, the first ecological fabric 3 is laid on the surface of the area 1 to be afforested and within the trench 2; then, the first soil layer 4 is backfilled into the trench 2 to press the first ecological fabric 3; then, the second ecological fabric 5 is laid on the first soil layer 4 to secure the first soil layer 4, so that the first and second ecological fabric 3 and 5 within the trench 2 and the trench 2 jointly form a bag structure for securing the first soil layer 4; finally, the second soil layer 4' is backfilled to press the second ecological fabric 5. For the purpose of greening, a plant growth material 100 can be laid on the surface of the area 1 to be afforested, and covered by the first ecological fabric 3, so that the plant growth material 100 is secured by the first ecological fabric 3 to avoid its loss. Depending on the needs in different environments, plant seeds can be mixed with the plant growth material, thereby enabling the plant seeds to grow and penetrate the first ecological fabric 3; it would be appreciated that the plant seeds can also be sprayed on the surface of the first ecological fabric 3, or it is also possible to grow plant seedlings, which is not limited herein.

Figure 3:
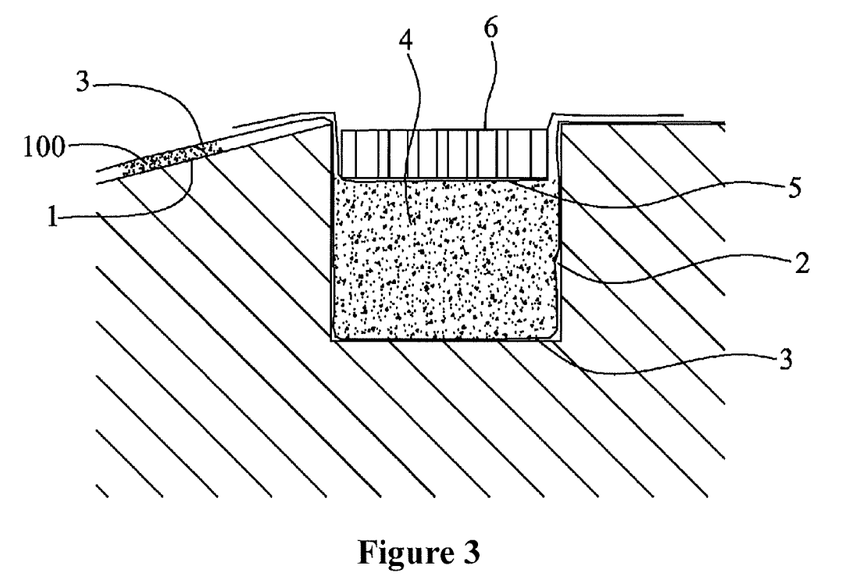
FIG. 3 is a schematic view of the construction structure of a second embodiment of the present invention.

FIG. 3 shows a second embodiment of the present invention, which is different from the first embodiment in that the second ecological fabric 5 is secured by a fastening weight 6 (which may be a stone, a metal product, etc.) in place of the second soil layer. The fastening weight 6 presses against the second ecological fabric 5. The fastening weight 6 may include a through hole, or there is a gap between the fastening weights, so that the greening plant in the trench 2 can grow through the hold or gap to the outside. For the purpose of greening, the plant growth material 100 can also be laid on the surface of the area 1 to be afforested, and covered by the first ecological fabric 3. Among others, the first soil layer 4 and the first ecological fabric 3 laid on the area 1 to be afforested and the trench 2 are likewise constructed as those of the first embodiment, and therefore are not further discuss here.

Figure 4:
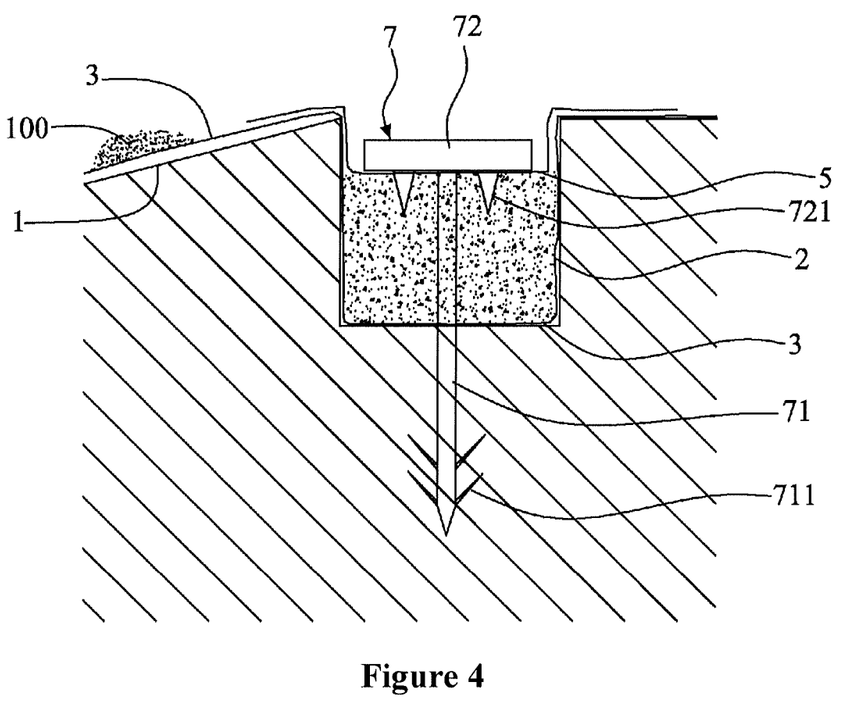
FIG. 4 is a schematic view of the construction structure of a third embodiment of the present invention.

FIG. 4 shows a third embodiment of the present invention, which is different from the foregoing embodiments in that the second ecological fabric 5 is fastened by means of an anchor rod 7, which includes a body 71 and an end cap 72 connected to an end of the body 71. The body 71 sequentially passes through the second ecological fabric 5, the first soil layer 4 and the first ecological fabric 3, to a predetermined depth beneath the bottom of the trench 2, and the end cap 72 presses the surface of the second ecological fabric 5. In order to stably secure the second ecological fabric 5 by the end cap 72, the undersurface of the cover 72 is provided with a plurality of spikes (or protrusions) 721 which can pierce and grasp the second ecological fabric 5; or the body 71 is provided with at least one agnail 711, so that the body 71 is difficult to be pulled out from underground, thus achieving the better effect of securement. For the purpose of greening, the plant growth material can be sprayed on the first ecological fabric 3 on the surface of the area 1 to be afforested, or alternatively laid on the area to be afforested and covered by the first ecological fabric. Among others, the first soil layer 4 and the first ecological fabric 3 laid on the area 1 to be afforested and the trench 2 are likewise constructed as those of the first embodiment, and therefore are not further discuss here.

Figure 5:
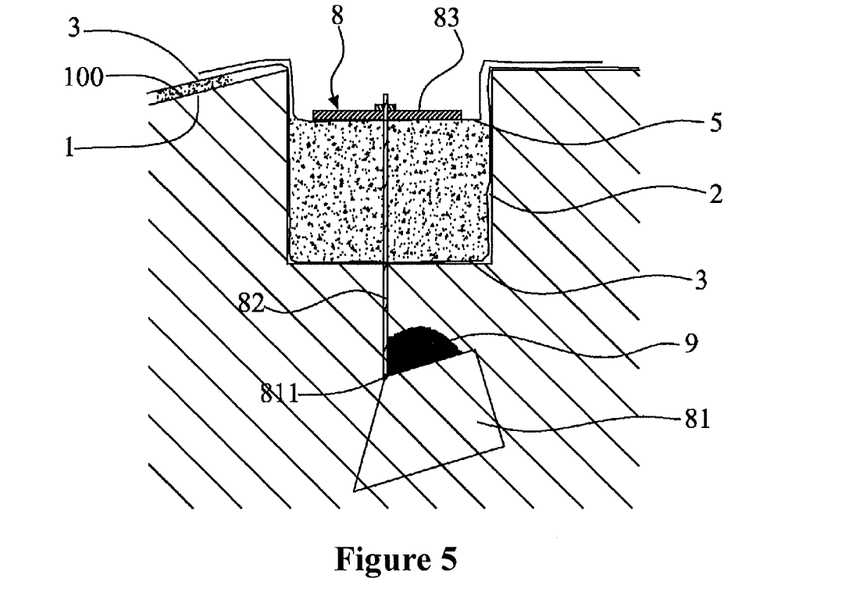
FIG. 5 is a schematic view of the construction structure of a fourth embodiment of the present invention.
Figure 6:
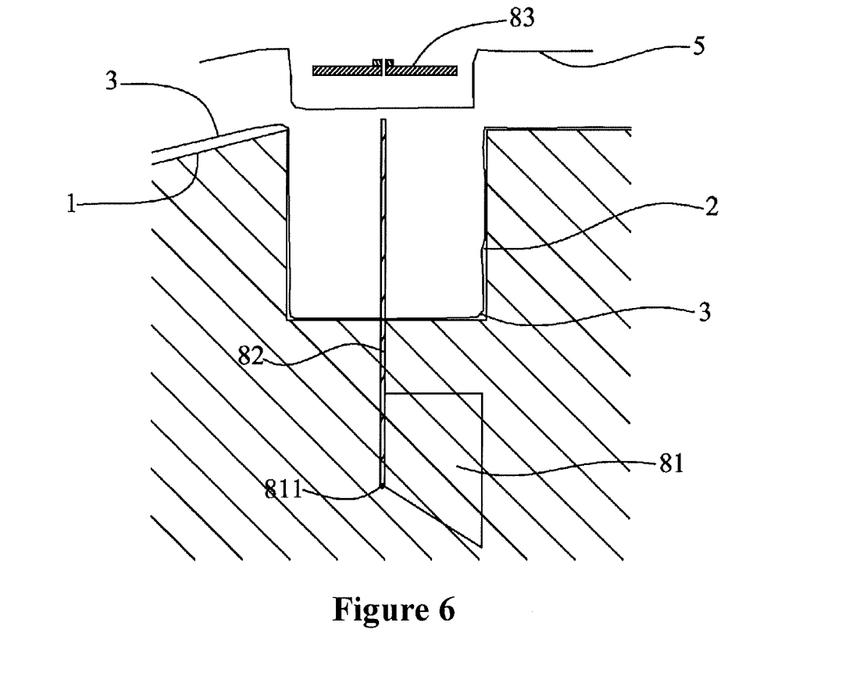
FIG. 6 is a schematic view of steps for the construction as shown in FIG. 4.

FIGS. 5 and 6 shows a fourth embodiment of the present invention, which is different from the foregoing embodiments in that the second ecological fabric 5 is fastened by a locking means 8, which includes a positioning member 81, a rope 82 and a positioning cover 83. The positioning member 81 is provided with a pivot fulcrum 811, to which one end of the rope 82 is fixedly connected. The positioning member 81 is buried at the predetermined depth beneath the bottom of the trench 2, and then rotated by a certain degree, so that the positioning member 81 can be more stably fastened beneath the bottom of the trench 2. The other end of the rope 82 sequentially passes through the first ecological fabric 3, the first soil layer 4, and the second ecological fabric 5, and is secured by the positioning cover 83 (the securement may be achieved by using a sleeve mounted on the positioning cover, with the sleeve being passed through by the rope and then being deformed to clamp the rope) which is arranged on and presses the second ecological fabric 5, thus allowing the rope 82 to be tightly tensioned between the positioning cover 83 and the positioning member 81, so that the first ecological fabric 3, the first soil layer 4, and the second ecological fabric 5 are secured in the trench 2 by the locking means 8. The positioning member 81 may be a metal plate or a plastic plate, and the rope may be a steel wire, an iron wire or a plastic rope. Further, the positioning member 81 may be adhesively bonded with a reinforcing layer 9 provided between the positioning member 81 and the bottom of the trench 2, and the reinforcing layer 9 may be a cement, adhesive, etc.

The construction method of the locking means 8 of the embodiment is as follows. Firstly, the positioning member 81 is buried at the predetermined depth beneath the bottom of the trench 2, here, a portion of the rope 82 is also buried together with the positioning member 81, and a pre-reserved portion of the rope 82 is exposed; then, the rope 82 is pulled by applying a force outwardly, so that the positioning member 81 is rotated by a certain degree about the pivot fulcrum 811 in the underground, which prevents the positioning member 81 from sliding out of the underground by a large resistance applied to the positioning member 81 underground; then, the other end of the exposed portion of the rope 82 passes through the first ecological fabric 3, and the first soil layer 4 is back-filled; then, the other end of the rope continues to pass through the second ecological fabric 5, and finally the positioning cover 83 presses the surface of the second the ecological fabric 5 and the rope 82 is securely held. The method for injecting the reinforcing layer 9 can be as follows. Particularly, a hollow tube is inserted into the underground together with the positioning member, here, the hollow tube will not be stuffed by soil during the inserting because it is plugged by a plug formed on the positioning member 81; when being inserted into a predetermined depth, the hollow tube is drawn out slightly and separated from the plug, and is filled with cement mortar or glue, which penetrate along the periphery of the positioning member 81, and then the hollow tube is completely drawn out. The cement mortar or glue is solidified and forms the reinforcing layer 9. For the purpose of greening, the plant growth material 100 may be laid in a manner as described referring to the foregoing embodiments, and therefore is not further discuss herein.

Figure 7:
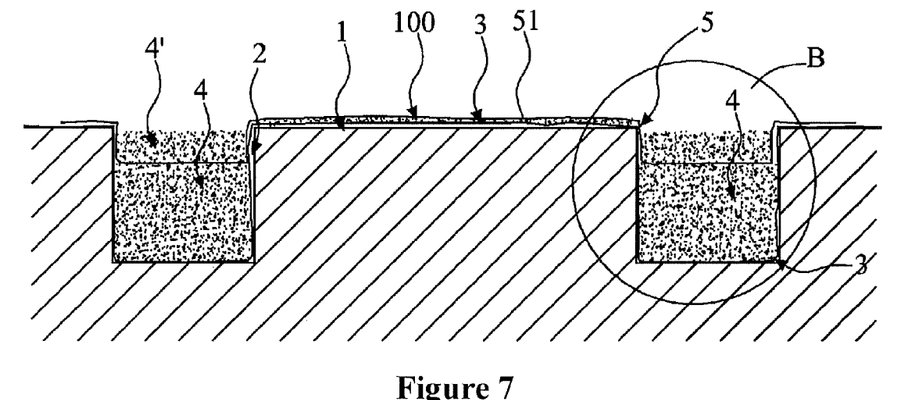
FIG. 7 is a schematic view of the construction structure of a fifth embodiment of the present invention.
Figure 8:
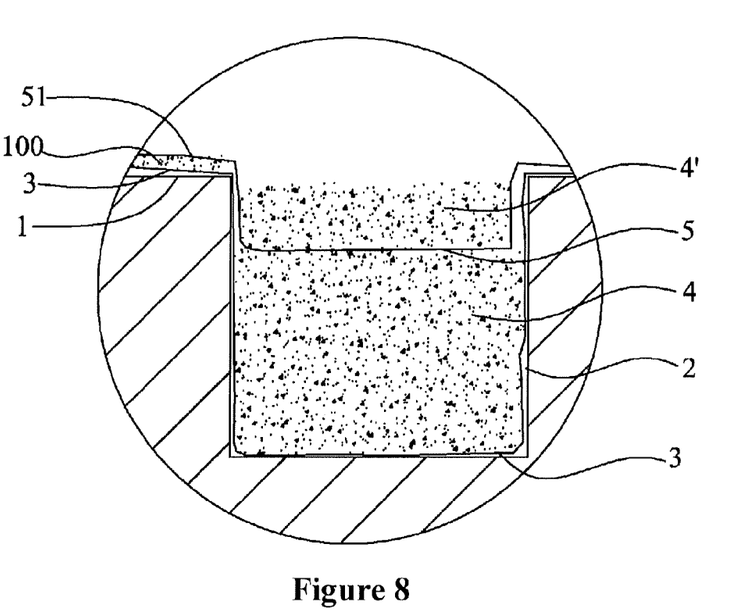
FIG. 8 schematically shows an enlarged structural view of a portion B in FIG. 7.

FIGS. 7 and 8 shows a fifth embodiment of the present invention, which is described by an example of greening for a desert, and is different from the foregoing first embodiment in that the extension portion 51 of the second ecological fabric 5 is placed on the first ecological fabric 3 located on the surface of the area 1 to be afforested, to form a two-layer structure. This two-layer structure of fabric is more suitable for afforesting zones such as a desert or a slope, because a plant growth material 100 and plant seeds may be placed between the first ecological fabric 3 and the extension portion 51 of the second ecological fabric 5, so that the plant seeds can grow and penetrate the second ecological fabric. Among others, the first soil layer 4 and the first ecological fabric 3 laid on the area 1 to be afforested and the trench 2 are likewise constructed as those of the first embodiment, and therefore are not further discuss here.

Figure 9:
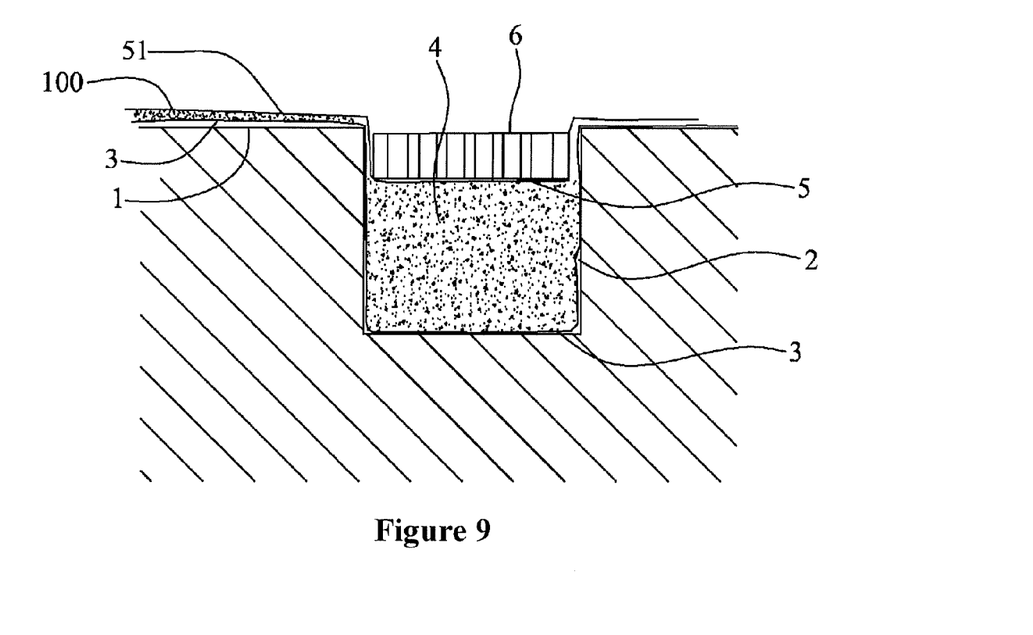
FIG. 9 is a schematic view of the construction structure of a sixth embodiment of the present invention.

FIG. 9 shows a sixth embodiment of the present invention, and the difference between the sixth embodiment and the foregoing second embodiment is the same as that between the fifth embodiment and the first embodiment. Particularly, the extension portion 51 of the second ecological fabric 5 is placed on the first ecological fabric 3 located on the surface of the area 1 to be afforested, to form a two-layer structure; for the purpose of greening, a plant growth material 100 and plant seeds may be placed between the first ecological fabric 3 and the extension portion 51 of the second ecological fabric 5. Among others, the first soil layer 4 and the first ecological fabric 3 laid on the area 1 to be afforested and the trench 2 and construction methods thereof, and the fastening weight 6 for securing the second ecological fabric 5 are likewise as those of the second embodiment, and therefore are not further discuss here.

Figure 10:
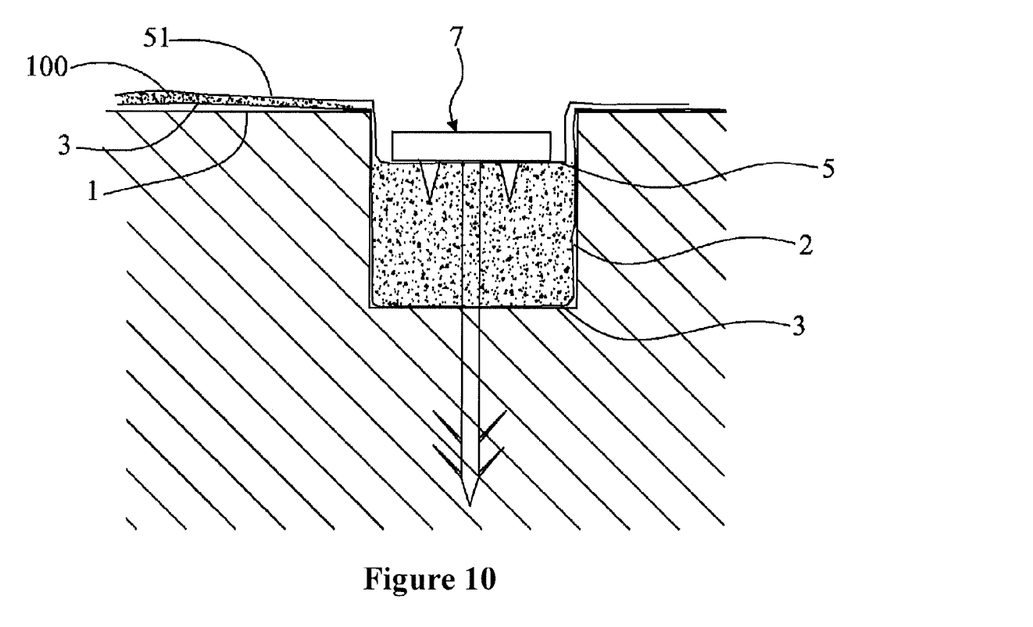
FIG. 10 is a schematic view of the construction structure of a seventh embodiment of the present invention.

FIG. 10 shows a seventh embodiment of the present invention, and the difference between the seventh embodiment and the foregoing third embodiment is the same as that between the fifth and sixth embodiments and the second embodiment. Particularly, the extension portion 51 of the second ecological fabric 5 is placed on the first ecological fabric 3 located on the surface of the area 1 to be afforested, to form a two-layer structure; for the purpose of greening, a plant growth material 100 and plant seeds may be placed between the first ecological fabric 3 and the extension portion 51 of the second ecological fabric 5. Among others, the first soil layer 4 and the first ecological fabric 3 laid on the area 1 to be afforested and the trench 2 and construction methods thereof, and the fastening structure by means of the anchor rod 7 are likewise as those of the third embodiment, and therefore are not further discuss here.

Figure 11:
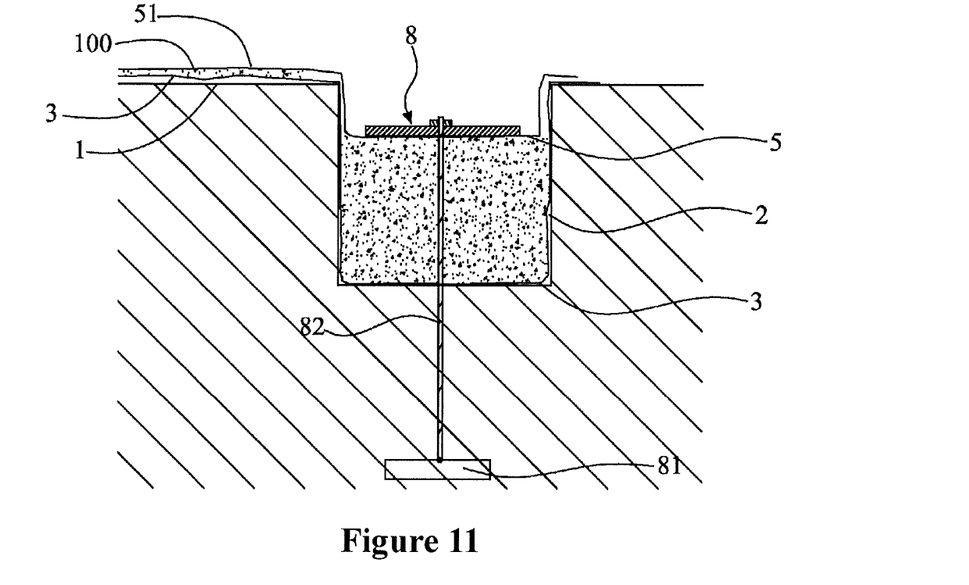
FIG. 11 is a schematic view of the construction structure of a seventh embodiment of the present invention.
Figure 12:
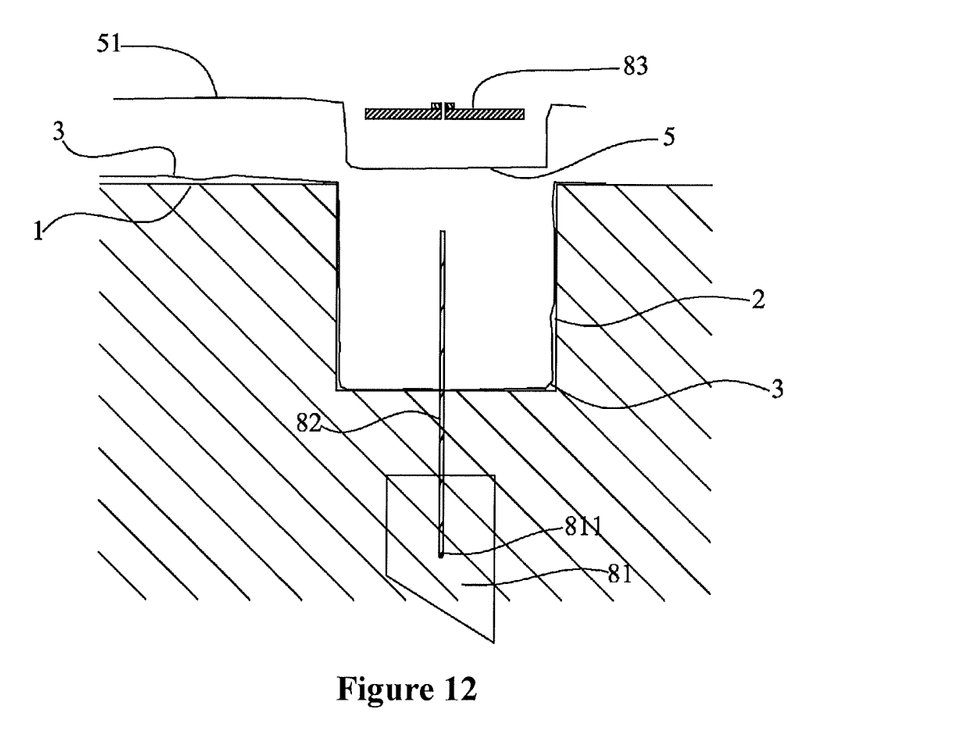
FIG. 12 is a schematic view of steps for the construction as shown in FIG. 11.

FIGS. 11 and 12 show an eighth embodiment of the present invention, the difference of this embodiment from the foregoing fourth embodiment is clear referring to the fifth to seventh embodiments. Particularly, the extension portion 51 of the second ecological fabric 5 is placed on the first ecological fabric 3 located on the surface of the area 1 to be afforested, to form a two-layer structure. Among others, the first soil layer 4 and the first ecological fabric 3 laid on the area 1 to be afforested and the trench 2 and construction methods thereof, and the fastening structure by means of the locking means 8 are likewise as those of the fourth embodiment. However, the positioning member 81 may be shaped as a sheet depending on various landforms, the pivot fulcrum 811 may be provided at the center of the positioning member, the positioning member 81 can be rotated by a force applied by the rope 82 so that the front surface of the positioning member 81 faces upwardly, and thus may be suitable for soft zones such as the desert. After being turned over, the drag area of the positioning member 81 is effectively increased, and thus may be more stably fastened beneath the sand. Likewise, the positioning cover 83 presses the second ecological fabric 5 located in the trench. For the purpose of greening, a plant growth material 100 and plant seeds may be placed between the first ecological fabric 3 and the extension portion 51 of the second ecological fabric 5.

Figure 13:
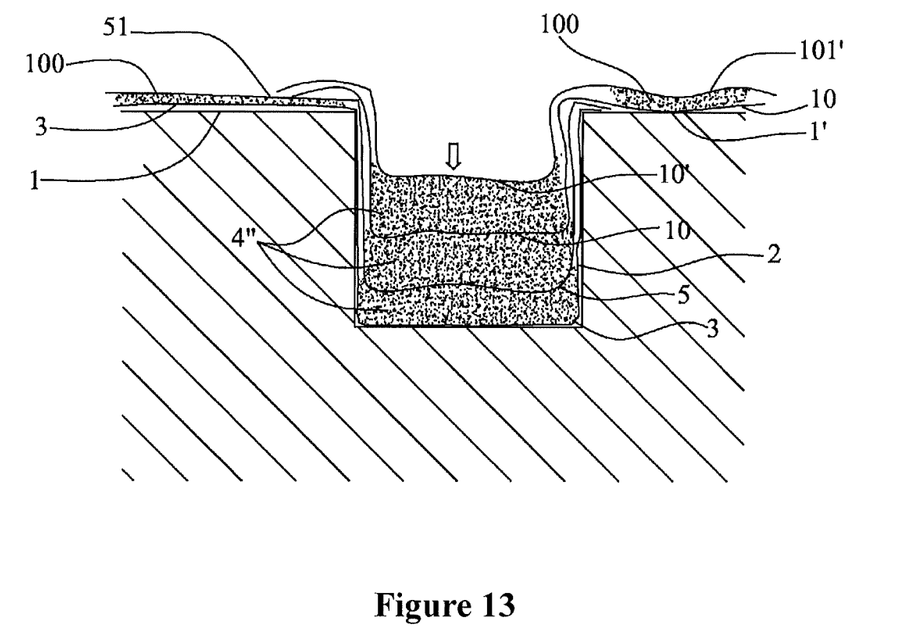
FIG. 13 is a schematic view of the construction structure of an eighth embodiment of the present invention.

FIG. 13 shows a ninth embodiment of the present invention, which illustrates the case where further two ecological fabrics 10, 10' for extension are required when the first ecological fabric 3 and the second ecological fabric 5 form a two-layer structure (reference may be made to the fifth to seventh embodiments); in this case, the first ecological fabrics 3 and 5 are first laid in a trench, and then those two ecological fabrics 10 and 10' for extension are laid in the same trench with the repeated construction method, so that four ecological fabrics in total are formed in the same trench 2, the respective soil layers 4" for pressing are laid between every two adjacent ones of the ecological fabrics 3, 5, 10 and 10', and the top ecological fabric may be fastened by the reinforcing structures of the foregoing various embodiments, which are not discussed hereinafter.

With the use of the trench, the first ecological fabric is sunk into the trench and is pressed by the first soil layer, which is then secured by the second ecological fabric, thus prevent the loss of the first soil layer, so that the first ecological fabric and the second ecological fabric within the trench and the trench jointly form a bag structure for securing the first soil layer. As a result, the ecological fabrics can be effectively and stably connected, and their construction is simple. The present invention can be widely applicable to greening construction of various geological environments, such as a desert, a slope and wastelands.

The above description discloses the preferred embodiment of the present invention, and does not limit to the technical scope of the present invention. Therefore, any modifications and equivalent variations and modifications for the above embodiments, based on the technical essence of the present invention, still fall within the scope of the technical solution of the present invention.

The invention claimed is:

1. A method for reinforcing an ecological greening fabric, wherein the method comprises steps of:
   a) forming a trench in an area to be afforested;
   b) laying a first ecological fabric on a surface of the area to be afforested and within the trench, and backfilling a first soil layer within the trench to press the first ecological fabric;
   c) fastening a second ecological fabric on the first soil layer to hold the first soil layer by the second ecological fabric, so that the first and second ecological fabrics within the trench and the trench jointly form a bag structure for fastening the first soil layer.

2. The method of claim 1, further comprising a step of:
   d1) backfilling a second soil layer or a fastening weight on a surface of the second ecological fabric located in the trench, with the second ecological fabric being pressed by the second soil layer or by the fastening weight.

3. The method of claim 1, further comprising a step of:
   d2) sequentially passing through the second ecological fabric, the first soil layer, the first ecological fabric by an anchor rod, to a predetermined depth beneath the bottom of the trench, with the second ecological fabric being pressed by an end cap of the anchor rod.

4. The method of claim 1, further comprising using a locking means which includes a positioning member, a rope and a positioning cover, wherein the positioning member is provided with a pivot fulcrum, to which one end of the rope is fixedly connected,
   wherein after the step a) is completed, the positioning member is buried at a predetermined depth beneath the bottom of the trench, a portion of the rope is also buried together with the positioning member, and a pre-reserved portion of the rope is exposed, and then the rope is pulled by applying a force outwardly, so that the positioning member is rotated a certain degree about the pivot fulcrum in the underground; and then at the step b), after the other end of the rope passes through the first ecological fabric, the first soil layer is backfilled; and then at the step c), the other end of the rope continues to pass through the second ecological fabric, and finally the positioning cover presses the surface of the second the ecological fabric and the rope is securely held, which allows the rope to be tightly tensioned between the positioning cover and the positioning member, so that the first ecological fabric, the first soil layer, and the second ecological fabric are secured by the locking means.

5. The method of any of claim 1, wherein, the second ecological fabric further includes an extension portion which is used to cover a surface of another area to be afforested.

6. The method of any of claim 1, wherein, the second ecological fabric further includes an extension portion which is used to cover the first ecological fabric on the surface of the area to be afforested so as to form a two-layer structure with the first ecological fabric.

7. A structure for reinforcing an ecological greening fabric, wherein the structure comprises: a first ecological fabric provided on a surface of an area to be afforested and within a trench, a first soil layer and a second ecological fabric; wherein, the first ecological fabric within the trench is pressed by the first soil layer, the second ecological fabric is fixedly provided on and holds the first soil layer, so that the first and second ecological fabrics within the trench and the trench jointly form a bag structure for fastening the first soil layer, wherein the surface of the second ecological fabric is provided with a second soil layer or a fixture with a hole.

8. The structure of claim 7, further comprising an anchor rod, which includes a body and an end cap connected to an end of the body, wherein, the body sequentially passes through the second ecological fabric, the first soil layer and the first ecological fabric, to a predetermined depth beneath the bottom of the trench, and the end cap presses a surface of the second ecological fabric.

9. The structure of claim 8, wherein, the undersurface of the end cap is provided with a plurality of spikes which is adapted to pierce the second ecological fabric.

10. The structure of claim 7, further comprising a locking means, which comprises a positioning member, a rope and a positioning cover, wherein, the positioning member is provided with a pivot fulcrum, to which one end of the rope is fixedly connected, the positioning member is buried at a predetermined depth beneath the bottom of the trench and rotated by a certain degree, the other end of the rope sequentially passes through the first ecological fabric, the first soil layer and the second ecological fabric, and is secured by the positioning cover which is arranged on and presses the second ecological fabric, so that the rope is tightly tensioned between the positioning cover and the positioning member, and the first ecological fabric, the first soil layer, and the second ecological fabric are secured by the locking means.

11. The structure of claim 10, wherein the positioning member is a metal plate or a plastic plate; and the rope is a steel wire, an iron wire or a plastic rope.

12. The structure of claim 10, wherein the positioning member is adhesively bonded with a reinforcing layer provided between the positioning member and the bottom of the trench.

13. The structure of claim 7, wherein the first soil layer is a plant growth material.

14. The structure of claim 7, wherein, the second ecological fabric also includes an extension portion which covers a surface of another area to be afforested.

15. The structure of claim 7, wherein, the second ecological fabric also includes an extension portion which covers the first ecological fabric on the surface of the area to be afforested so as to form a two-layer structure.

* * * * *